March 25, 1969 W. L. BRACKIN 3,434,696
HOOK ASSEMBLY
Filed June 26, 1967
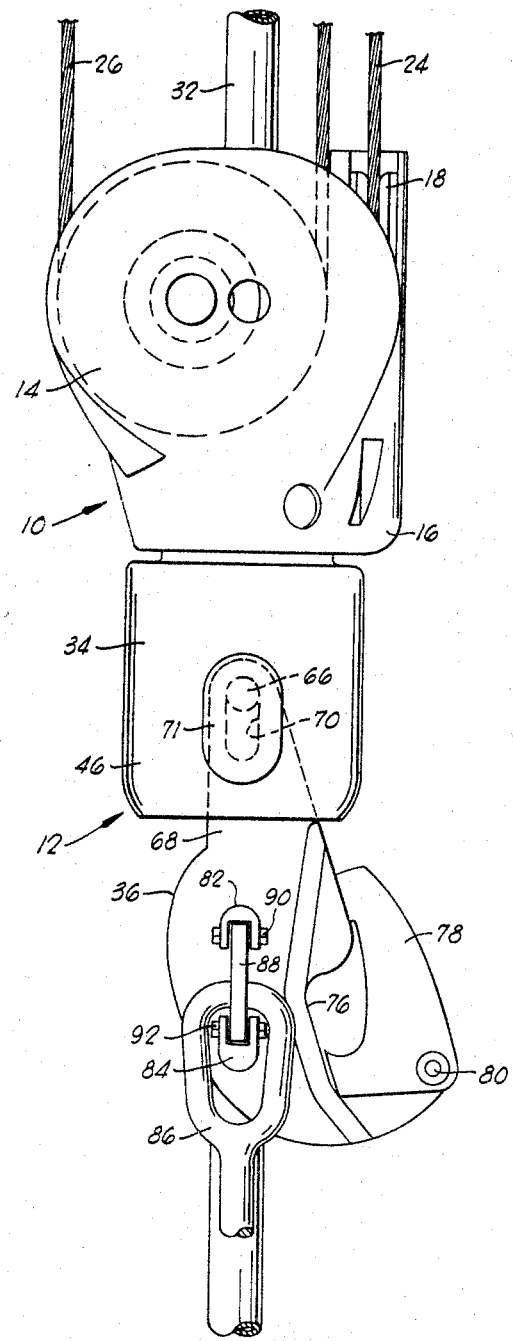
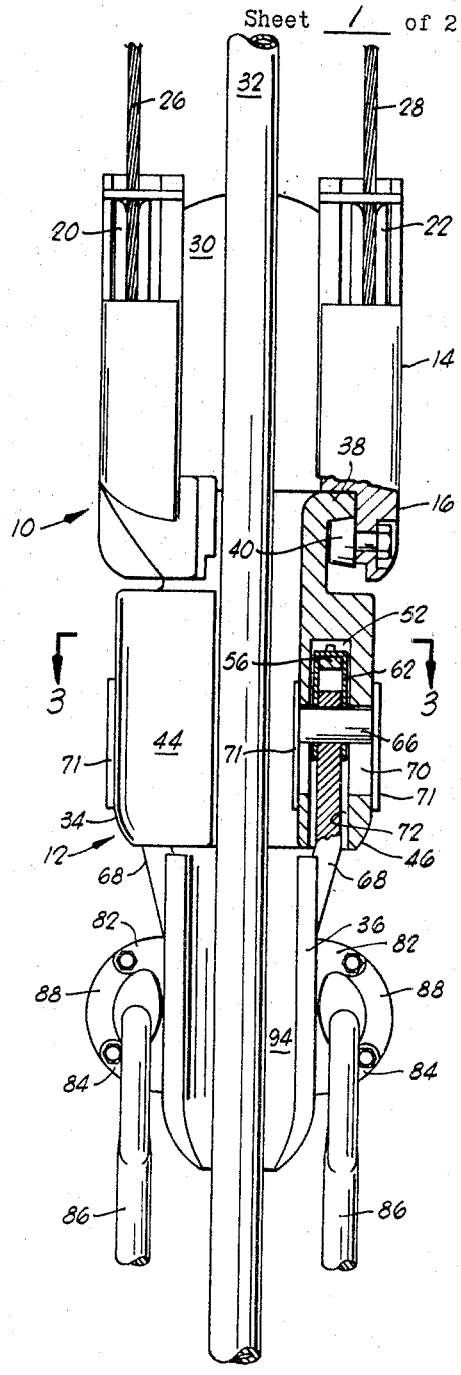
INVENTOR.
WAYNE L. BRACKIN
BY
ATTORNEY

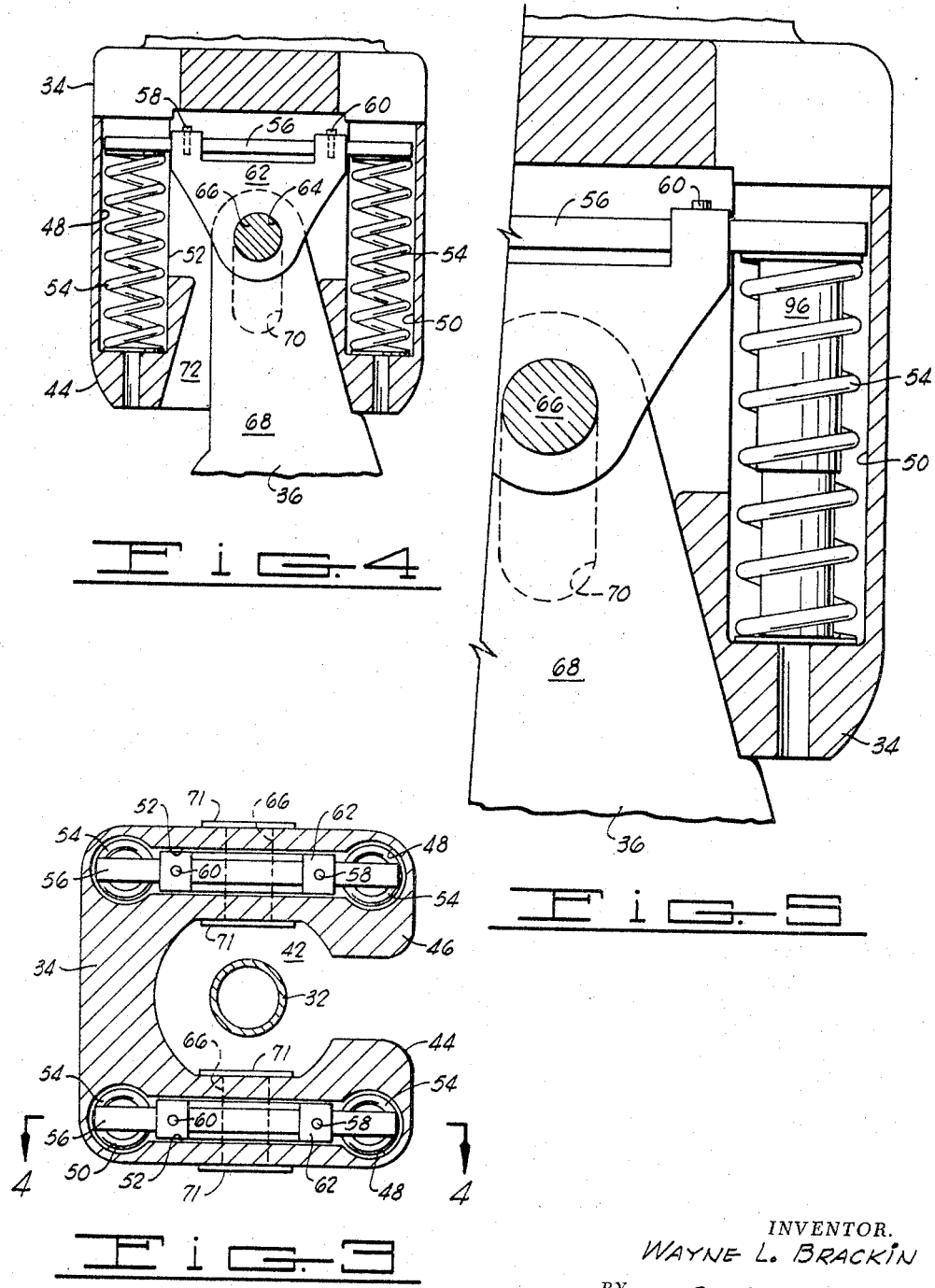

United States Patent Office 3,434,696
Patented Mar. 25, 1969

3,434,696
HOOK ASSEMBLY
Wayne L. Brackin, Warren, Tex., assignor to Dresser Industries Inc., Dallas, Tex., a corporation of Delaware
Filed June 26, 1967, Ser. No. 648,929
Int. Cl. B66c 1/36; E21c 9/00
U.S. Cl. 254—192                 5 Claims

ABSTRACT OF THE DISCLOSURE

A hook assembly for use with a split-type traveling block to raise and lower a string of pipe during the drilling, completion and workover of oil and gas wells and the like wherein said hook assembly includes an adapter and a hook, each being provided with an opening sized and arranged to receive the string of pipe. The upper end of the adapter is connected with the traveling block and the hook is supported resiliently by the adapter for limited pivotal and longitudinal movement relative thereto.

Background of the invention

This invention relates generally to improved hoisting equipment located on drilling rigs and used to handle the pipe during drilling, completion and servicing of wells and the like. More particularly, but not by way of limitation, this invention relates to an improved hook assembly that connects a traveling block to both the elevators and the swivel.

The hook assembly of this invention has particular utility when used in connection with a traveling block having an opening extending vertically therethrough, that is, a split-type traveling block. As will be described in detail hereinafter, the hook assembly of this invention includes an adapter connected to the traveling block and supporting a hook therebelow.

The hook and adapter are each provided with an opening that is aligned axially with the opening extending through the traveling block. The purpose of the axially aligned openings is to permit the traveling block, hook, and adapter to move relative to the pipe without being deflected to one side of the pipe while the section of pipe is being made up or broken out of the pipe string. The use of hoisting apparatus having the axially aligned openings permits the traveling block, hook assembly and the elevator, which are used to support the pipe string during movement thereof into and out of the well bore, to be moved vertically relative to the pipe as the connections are made or broken, thereby saving considerable time while running the pipe string into or removing the pipe string from the well bore.

United States Patent No. 3,278,163, issued on Oct. 11, 1966, entitled, "Hook Assembly," illustrates hoisting equipment previously constructed that has axially aligned openings extending therethrough. A hook assembly constructed as described in the patent, operates in generally satisfactory manner, but there are some disadvantages attendant in the structure described therein that are overcome by this invention.

For example, the structure described in the patent for resiliently and pivotally supporting the hook on the block is inherently of larger size than desired. The expedient of scaling down the size of the assembly cannot be utilized to reduce the size because of the desirability of maintaining all the functional features of the assembly and the necessity for maintaining the high load supporting ability of the assembly.

The overall size of the hook assembly is particularly important when the hook assembly is utilized in the relatively small mobile drilling and/or workover units. Due to the relatively small size of the mast utilized in the mobile equipment, space, both transverse to the longitudinal axis of the pipe string and along the longitudinal axis of the pipe string, is at a premium.

Also, the structure described in the patent necessitates the use of a number of relatively expensive machined parts for supporting the hook on the traveling block. The machined parts can be eliminated by constructing the hook assembly as described in detail hereinafter.

Summary of the invention

This invention provides an improved hook assembly for use with a traveling block to raise and lower apparatus, such as a string of pipe, during the drilling, completion and workover of oil and gas wells or the like. The improved hook assembly comprises a hook having an opening therein arranged to receive the pipe, and a pair of lug portions on the hook member disposed adjacent opposed sides of the opening; an adapter member having a top portion arranged for connection with the traveling block, a bottom portion having a pair of spaced recesses for receiving the lug portions of the hook, and an opening that is aligned axially with the opening in the hook and also arranged to receive the pipe; and means connecting the adapter and hook that is located in the adapter and arranged to permit relative pivotal and longitudinal movement between the hook and adapter. The connecting means including resilient means resiliently supporting the hook against initial longitudinal movement and being engageable with the adapter to support a load imposed on the hook when the load exceeds the strength of the resilient means.

One object of the invention is to provide an improved hook assembly that is substantially reduced in overall size while maintaining all the functional characteristics and while retaining the maximum load carrying ability available in prior constructed hook assemblies.

Another object of the invention is to provide an improved hook assembly wherein the various components forming the hook assembly are manufactured without expensive machining operations.

An additional object of the invention is to provide an improved hook assembly wherein initial and impact loads imposed thereon are substantially absorbed by resilient means disposed between the hook and adapter and, wherein, the direct engagement of the hook and adapter carries loads imposed thereon that exceed the strength of the resilient means.

The foregoing and additional objects and advantages of the invention will become more apparent as the following detailed description is read in conjunction with the accompanying drawing.

Brief description of the drawing

FIG. 1 is a side elevation view of hoisting apparatus constructed in accordance with the invention.

FIG. 2 is a rear elevation view of the hoisting apparatus of FIG. 1.

FIG. 3 is an enlarged partial cross-sectional view taken generally along the line 3—3 of FIG. 2.

FIG. 4 is a cross-sectional view taken generally along the line 4—4 of FIG. 3.

FIG. 5 is an enlarged, partial cross-sectional view similar to a portion of FIG. 3, but illustrating a modified form of apparatus that is also constructed in accordance with the invention.

Description of the preferred embodiment

Referring to the drawing and to FIG. 1 in particular, shown therein and generally designated by the reference character 10 is hoisting apparatus that includes a hook assembly 12 constructed in accordance with the invention.

The hoisting apparatus 10, in addition to the hook assembly 12, includes a traveling block 14 comprising a housing 16, a sheave 18 and spaced sheaves 20 and 22 (see FIG. 2).

When the hoisting apparatus 10 is used in a drilling rig (not shown), the sheave 18 is threaded with a cable 24 that extends upwardly therefrom over a crown block (not shown) mounted in the top of the drilling rig. Similarly, the sheaves 20 and 22 are threaded, respectively, with cables 26 and 28 that also extend upwardly over the crown block. The cable and sheave arrangement is such that the traveling block 14 and the hoisting apparatus 10 are raised and lowered in the drilling rig as the various cables are moved therethrough.

As may be seen more clearly in FIG. 2, an opening 30 is located in the traveling block 14 between the spaced sheaves 20 and 22. The opening 30 extends vertically through the block 14 and is sized to receive a pipe 32.

The hook assembly 12, which is supported by the traveling block 14, includes an adapter 34 and a hook 36 that is connected operably with the adapter 34, as will be described in detail hereinafter. The upper end of the adapter 34 is provided with an arcuate exterior flange 38 that projects itno the housing 16 of the traveling block 14. The flange 38 supportingly engages a plurality of rollers 40 (only one is shown in FIG. 2) that are mounted in the housing 16, connecting the adapter 34 with the traveling block 14 for vertical movement therewith and for relative rotation therebetween.

An opening 42 extends vertically through the adapter 34 from the top to the bottom of the adapter in axial alignment with the opening 30 in the traveling block 14. The opening 42 is also sized to receive the pipe 32.

As illustrated most clearly in FIG. 3, the opening 42 also extends through one wall of the adapter 34 so that the adapter 34 is of a generally U-shaped configuration and includes legs 44 and 46 that are disposed in spaced relation on either side of the adapter 34 adjacent opening 42. In view of the fact that the internal structure of each of the legs 44 and 46 is identical, only the structure of the leg 44 will be described in detail.

As shown in FIGS. 3 and 4, the leg 44 is provided with a pair of spaced recesses 48 and 50 that extend downwardly therein from the upper portion of the adapter 34. A support member slot 52 extends between and interconnects the recesses 48 and 50.

Disposed in each of the recesses 48 and 50 are identical compression springs 54. The springs 54 have their lower end in engagement with the adapter 34 and their upper end in engagement with an elongated support member 56 that extends into the recesses 48 and 50 and is disposed in the support member slot 52.

The support member 56 is connected with a bifurcated yoke 62 pins 58 and 60. The yoke 62 extends downwardly from the support member 56 into the slot 52. The yoke 62 is provided with aligned holes 64 in the lower ends of the bifurcations for receiving a pivot pin 66.

The pivot pin 66 extends through a hole formed in the upper end of a hook lug 68, through the holes 64 in the yoke 62 and through a pair of aligned pin slots 70 (shown in dash lines in FIG. 4) located in the leg portion 44. To retain the pivot pin 66 in the adapter 34, cover plates 71 are welded or otherwise suitably secured to the adapter 34, covering the slots 70.

With no load exerted on the hook 36, the pivot pin 66 is disposed in the upper ends of the pin slots 70 in engagement with the adapter 34 as a result of the biasing force exerted by the springs 54 on the support member 56. When a load is imposed on the hook 36, the pivot pin 66 moves downwardly in the slots 70, compressing the springs 54, until the load imposed is sufficiently great to overcome the upward force exerted by the springs 54, at which time the pivot pin 66 engages the adapter 34 at the lower end of the pin slots 70. Thus, the adapter 34, when the load is sufficiently great, carries the load on the hook 36 through the direct engagement of the pivot pin 66 with the adapter 34.

The leg 44 is also provided with a hook slot 72 that extends through the lower portion and bottom thereof in communication with the support member receiving slot 52. The hook slot 72 is sized and arranged to loosely receive the lug 68 of the hook member 36 to permit pivotal movement of the hook 36 relative to the adapter 34 about the pivot pin 66.

Referring again to FIGS. 1 and 2, the hook 36 includes the generally U-shaped hook body 74 depending from the lugs 68. A recess 76 formed in the front portion of the hook body 74 is arranged to receive a tongue 78. The tongue 78 is pivotally connected with the hook body 4 by a pin 80 and is arranged to be retained in the closed position illustrated in FIG. 1 by a releasable latch (not shown).

An upper protuberance 82 and a lower protuberance 84 are formed on each side of the hook body 74 with the lower proturberance 84 being arranged to support an elevator bale 86. The bale 86 is retained in the position illustrated on the hook 36 by a link 88 that extends between the protuberances 82 and 84. The link 88 is removably connected to the proturbances 82 and 84 by threaded fasteners 90 and 92, respectively.

The elevator bales 86 extend downwardly from the hook 36 carrying at their lower ends (not shown) an elevator (not shown) that is arranged to engage the pipe 32 whereby the pipe 32 can be raised and lowered in the well bore. The structure and operation of the elevator is well known and understood by those skilled in the art. The structure of the elevator will not be discussed in detail in this application.

The hook body 74 also includes an opening 94 in the rear side thereof. The opening 94 is sized and arranged to receive the pipe 32 and is aligned axially with the opening 42 in the adapter 34 and with the opening 30 in the traveling block 14.

As clearly illustrated in FIG. 1, the protuberances 82 and 84 on the hook body 74 are arranged so that the elevator bales 86 extend downwardly exerting an axial pull on the hoisting apparatus 10 when the elevators (not shown) are in engagement with the pipe 32. When the hoisting apparatus 10 is utilized for lifting by means of the hook 74, that is, when the load is imposed on the tongue 78, the hook 36 pivots about the pivot pin 66 to a position wherein the load imposed on the hook 36 is in axial alignment with the hoisting apparatus 10. Thus, regardless of whether the load is applied through the elevator or directly to the hook 36, the load will be in compression on the springs 54.

It will be apparent to those skilled in the art that the adapter 34 is suitably arranged to have the various recesses, openings, and slots formed therein during the casting process by which the adapter 34 is preferably made, and that there will be no expensive machining necessary to form the adapter 34. Similarly, the hook 36, with the exception of the holes for the pin 80, the pivot pin 66, and the threaded fasteners 92 can be used in the "as cast" condition. Therefore, there will be no expensive machining necessary to construct the hook 36. Thus, the entire hook assembly 12 can be quickly and easily manufactured at a very economical cost as compared to prior art hook assemblies which have required extensive machining.

It should also be pointed out that the provision of the lugs 68 with the pivot pin holes therein provide an extremely strong connection between the adapter 34 and hook 36 as compared to the usual pivotal connection which extends through a circular spring guide member as typified by the spring guide structure in Patent No. 3,278,163.

In operation, the hoisting apparatus 10 is assembled substantially as illustrated in FIG. 1 with the elevator (not shown) encircling the pipe 32. When it is desired to raise the pipe 32, the elevator is placed in a position to engage the pipe, and the hoisting apparatus 10 raised by means of the cables 24, 26 and 28. As the elevator engages the pipe, the springs 54 contained in the adapter 34 are compressed by the support member 56 so that any shock imparted thereto upon engagement of the elevator with the pipe 32 is absorbed in the springs 54.

The springs 54 are designed to have sufficient strength to support a stand of pipe, which usually includes three sections of pipe that are each thirty feet in length. Thus, when a stand is being raised by the hoisting apparatus 10, the stand is resiliently supported by the hook 36 through the springs 54.

If the hoisting apparatus 10 is being used to raise the entire string of pipe, which may include many stands, the springs 54 are compressed by the support member 56 until the pivot pins 66 engage the adapter 34 at the bottom of the slots 70 so that the load on the hook 36 is carried by mechanical engagement between the pins 66, the lugs 68, and the adapter 34. It should also be pointed out that the springs 54 are designed so that they are not at their closed height when the pivot pins 66 engage the adapter 34, thereby avoiding damage to the springs 54 when the springs are compressed.

When removing individual pipe sections or stands of pipe from the remaining portion of the pipe string by unthreading the connection therebetween, the resilient connection between the adapter 34 and the hook 36 provides a complete and automatic separation of the threaded joint. The springs 54 engage the support member 56 exerting an upwardly directed force on the hook 36, the elevator and the stand of pipe engaged by the elevator. The upwardly directed force moves the stand away from the remaining portion of the pipe string as the threads are unscrewed so that, upon complete disengagement of the threads, the stand is free of the threaded connection. The upward force exerted on the stand reduces the torque required to unscrew the connection and the complete separation of the threaded connection reduces the possibility of damaging the threads.

One further purpose served by the resilient connection between the hook 36 and the adapter 34 is when the hoisting apparatus 10 is utilized in a high speed method of removing pipe from the well bore. In such method, the hoisting apparatus 10 is moved at a relatively high rate of speed along the pipe 32 until the elevator reaches the upper end of the pipe, at which time the elevator is actuated to engage the upper end of the pipe 32, Since the point of such engagement occurs approximately ninety feet above the rig floor where the driller who controls the movement of the hoisting apparatus 10 is located, a severe impact may occur between the hoisting apparatus and pipe when the elevator engages the pipe 32. Sometimes, the impact is of sufficient magnitude to damage the hoisting apparatus if the driller misjudges the location of the elevator relative to the top of the pipe 32. However, when the hoisting apparatus 10 containing the resilient connection described is used, the springs 54 are deflected when the engagement occurs, absorbing the impact and reducing the possibility of damaging the hoisting apparatus 10.

Modification of FIG. 5

The partial cross-sectional view of FIG. 5 illustrates a modified form of the adapter 34 that includes a plurality of shock absorbers 96. One of the shock absorbers 96 is disposed within each of the compression springs 54. As shown in FIG. 5, the upper end of each shock absorber 96 is disposed in engagement with one end of one of the support members 56 and the lower end thereof is in engagement with the adapter 34 at the bottom of the recess 50. It will be understood that one of the shock absorbers 96 will be located as described in each of the springs 54. While the shock absorbers 96 are shown as being of the telescoping type, they may be of any suitable configuration.

The shock absorbers 96 are provided to prevent oscillation or "bounce" that may occur in the resilient connection between the hook 36 and the adapter 34 and to prevent the sudden application of compressive loads on the springs 54 which could result in damage to the springs. Oscillation of the springs 54 and the hook 36 may result in the disengagement of the elevator (not shown) if the impact between the elevator and the pipe 32 and the resulting sudden movement of the elevator is sufficiently great. Also, the shock absorbers 96 tend to reduce the rate of oscillation created by the springs 54 during other operations in which the hoisting apparatus 10 is utilized.

As will be apparent from the foregoing detailed description, the provision of the springs 54 in the recesses 48 and 50 in the corners of each of the legs 44 and 46 permits the adapter 34 to be constructed with a minimum overall dimension while, at the same time, providing an adapter that can be utilized with the split-type traveling block. The provision of four springs 54 not only affords a reduction in size by reducing the spring size requirement through better load distribution, but also avoids the necessity for locating the two relatively large springs on opposed sides of the adapter as is typical of prior art devices.

As previously mentioned, the overall size is of particular importance when the hoisting apparatus is to be used on mobile drilling equipment. Also, the reduction in size is advantageous in that it will be accompanied by a reduction in the weight and cost of the apparatus.

It will be understood by those skilled in the art that the embodiments described hereinbefore are presented by way of example only and many changes and modifications can be made thereto without departing from the spirit of the invention or from the scope of the annexed claims.

The embodiments of the invention in which an exclusive property or privilege is claimed are defined as follows:

1. A hook assembly for use with a traveling block to raise and lower apparatus, such as a string of pipe, during the drilling, completion, and work-over of oil and gas wells or the like, said hook assembly comprising:
   a hook member having
      an opening therein arranged to receive the pipe, and
      a pair of lug portions on said hook member disposed adjacent opposed sides of said opening;
   an adapter member having
      a top portion arranged for connection with the traveling block,
      a bottom portion including a pair of spaced recesses sized to receive the lug portions on said hook member, and
      an opening arranged to receive the pipe, said opening being axially aligned with the opening in said hook member; and
   connecting means located in said adapter member operably connecting each lug portion of said hook member to said adapter member for relative pivotal and longitudinal movement between said hook member and adapter member, each said connecting means including an elongated support member operably connected with each said lug portion, said support members being movably disposed in said adapter member, and a pair of spaced springs located in said adapter member, each of said springs having one end engaging a respective end of one of said support members and having the other end engaging said adapter member, said springs resiliently supporting said hook member against initial longitudinal movement, said connecting means being engageable with said adapter member to support a load imposed on said hook member when the load exceeds the strength of said resilient means.

2. The hook assembly of claim 1 wherein said connecting means also includes a shock absorber disposed within each of said springs, each said shock absorber having one end engaging said support member and the other end engaging said adapter member.

3. A hook assembly for use with a traveling block to raise and lower apparatus, such as a string of pipe, during the drilling, completion, and work-over of oil and gas wells or the like, said hook assembly comprising:
  a hook member having
    an opening therein arranged to receive the pipe, and
    a pair of lug portions projecting therefrom and arranged on said hook member on opposed sides of said opening, each of said lug portions being provided with an aperture extending transversely with respect to said opening, said apertures being in axial alignment;
  an adapter member having
    a top portion arranged for connection with the traveling block,
    a bottom portion including a pair of spaced recess sized to receive the lug portions on said hook member,
    an opening arranged to receive the pipe and axially aligned with the opening in said hook member, and
    slots extending generally parallel to the opening in said adapter member and having a portion thereof aligned with the apertures in said lug portions;
  a pin located in each of said apertures and aligned slots operably connecting said hook member and adapter member and permitting relative pivotal and longitudinal movement between said hook member and adapter member;
  support means connected with each said pin, said support means including an elongated support member and a yoke member pivotally connected with said pin and with said support member; and
  resilient means located in said adapter member disposed between said support means and said adapter member, said resilient means including a pair of spaced compression springs with one end of each of said springs, biasing said pins relatively toward the ends of said slots nearest the top portion of said adapter member, engaging one end of said support members and with the other ends of said springs engaging said adapter member, whereby said hook member is resiliently supported in said adapter member against initial movement, said pins being engageable with the other ends of said slots when the load imposed on said hook member exceeds the strength of said resilient means.

4. The hook assembly of claim 3 wherein the opening in said adapter member extends through one wall of said adapter member from said top portion to said bottom portion forming a pair of leg portions;
  each said support means, resilient means and pin is located in a respective one of said leg portions; and,
  wherein the opening in said hook member extends through one wall thereof in alignment with the extension of the opening through the wall of said adapter member.

5. A hook assembly for use with a traveling block comprising:
  a body member having a top portion and a bottom portion, the top portion being arranged for connection with the block, said body member also having
    an opening extending from the top to the bottom of said body member through one wall thereof forming a pair of spaced leg portions on said body member,
    a pair of spaced recesses extending parallel to said opening in each leg portion,
    a support member slot in each leg portion connecting said recesses,
    a hook slot in each leg portion extending from a respective one of said support member slots through the bottom of said body member, and
    an elongated pin slot on each leg portion extending transversely relative to said opening and having the long dimension of said pin slot disposed parallel to said opening;
  a compression spring disposed in each said recess;
  an elongated support member disposed in each of said support member slots and having the ends thereof located in said recesses in engagement with said springs;
  a hook member having a pair of lug portions, one of said lug portion being disposed in a respective one of said hook slots and each having a pin hole therein arranged to be aligned with the pin slots in said body member;
  a pair of pins, one of said pins being located in the aligned pin hole and pin slots in a respective one of sad leg portions; and,
  a pair of yoke members operably connecting said lug portions with said support members, whereby said springs resiliently support said hook member at least until the compressive strength of said springs is exceeded by a load imposed on said hook member whereupon said pins engage the ends of said pin slots closest to said hook member.

References Cited

UNITED STATES PATENTS 3,278,163   10/1966   Marks _____ 254—192

EVON C. BLUNK, *Primary Examiner.*

HARVEY C. HORNSBY, *Assistant Examiner.*